United States Patent Office 3,264,262
Patented August 2, 1966

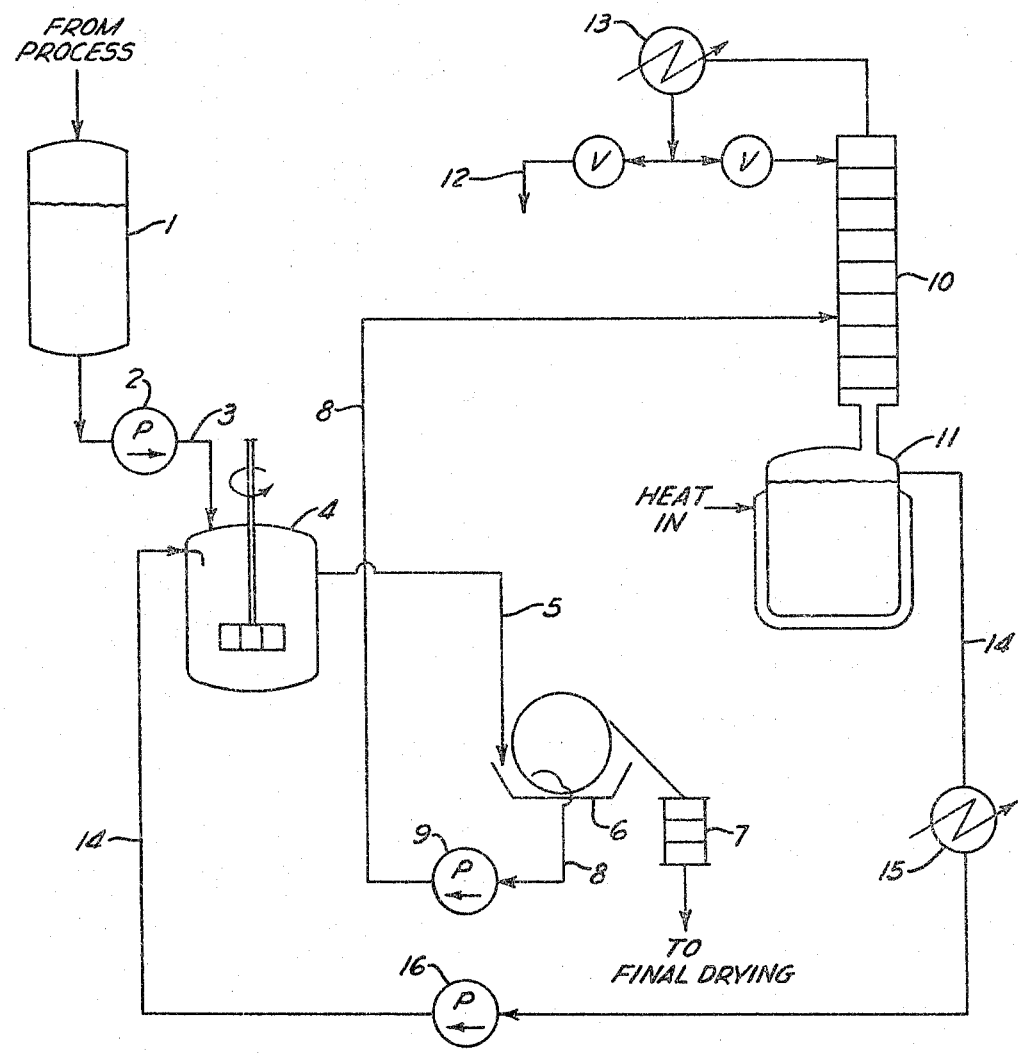

3,264,262
POLYCARBONATE RECOVERY SYSTEM
Peter J. Baker and John V. Bailey, New Martinsville, W. Va., assignors to Mobay Chemical Company, Pittsburgh, Pa., a corporation of Delaware
Filed May 22, 1963, Ser. No. 282,288
11 Claims. (Cl. 260—47)

This invention relates to polycarbonates and more particularly to a novel process for the recovery of solid polycarbonates from a solution thereof.

There are known in the prior art various methods for making polycarbonates. The most commercially used process is one described in U.S. Patent 3,028,365 wherein 2,2-bis(4-hydroxy phenyl)-propane is phosgenated to the desired polycarbonate material. This dihydroxy diphenyl propane is commonly known as "Bisphenol A." The phosgenation step is carried out in the presence of an inert organic solvent such as, for example, methylene chloride, thus resulting in a product in solution form. For commercial purposes, such as economics, handling and further processing, it is required that the polycarbonate be in a substantially solid form such as a powder or a granular material. There are various methods for the recovery of the polycarbonate from a solution, some of which are (1) extrusion, whereby the solvent is volatilized off and the solvent-free polycarbonate extruded; (2) evaporation of the solvent from the solution thereby leaving the polycarbonate in a somewhat solid form; and (3) crystallization and precipitation processes. On a large commercial scale, probably the most suitable of the above-noted procedures are the precipitation processes whereby the polycarbonate is precipitated from the solution (using a polycarbonate non-solvent as the precipitating agent) and subsequently removed by filtration or other separation means. One of the inherent drawbacks of these procedures, however, is that the yields are not optimum due to unrecovered polycarbonates which remain in the filtrate after filtration. It has been estimated that because of the loss of this polycarbonate, a corresponding yield loss as high as about 15% occurs. Another disadvantage of these precipitation procedures is the difficulty encountered in total separation of the solvent from the non-solvent. This problem is caused by residual unrecovered polycarbonate present in the solvent or filtrate which deposits on the heat transfer surfaces during the separation steps and thus hinders or even prevents the effective heat transfer required for the total separation. Also to completely separate the solvent and non-solvent from each other on a large commercial scale requires substantial amounts of heat and/or other energy thereby necessitating high initial outlays and continuing utility costs.

It is, therefore, an object of this invention to provide a process for the recovery of polycarbonate from solution which is devoid of the aforementioned disadvantages. It is another object of this invention to provide a continuous process for the substantially total recovery of polycarbonates from solution. Another object of this invention is to provide a process for the recovery of polycarbonate from a solution whereby any initially unrecovered polycarbonate is not lost but an equivalent amount remains internally recycled in the recovery system. Another object of this invention is to provide a process for the production of polycarbonates having comparatively high bulk density. A still further object of this invention is to provide a process for the recovery of polycarbonates from solution whereby the complete separation of the liquid components used is not necessitated nor required.

The foregoing objects and others which will become apparent from the following description are accomplished in accordance with this invention by providing a continuous process for the substantially complete separation of solid polycarbonate from a solution whereby a polycarbonate solution is continuously mixed in a mixing vessel with a precipitating solution (which is a liquid in which the polycarbonate is insoluble) and a slurry obtained. The content of this slurry is controlled so as to contain from about 1 to about 15 parts polycarbonate together with a solution of from about 35 to about 65 parts by weight of polycarbonate solvent and from about 35 to about 65 parts by weight of a polycarbonate non-solvent. After this slurry leaves the mixing vessel, the precipitated polycarbonate is separated from the liquid phase in a first separation means and the liquid phase is passed to a second separation means. At this second separation means an amount of solvent is removed to readjust the proportion of the components within the above operable range. After start up and a few passes, this can be accomplished by removing from this liquid phase substantially all of the solvent which is added to the mixing vessel via the polycarbonate solution. The solution remaining is continuously recycled to the mixing vessel where it is mixed with a fresh supply of polycarbonate solution.

The liquid used to precipitate the polycarbonate at the time of its admixture with the polycarbonate solution contains a polycarbonate solvent and a polycarbonate non-solvent in such proportions that after mixing, the resulting mixture or slurry contains a polycarbonate solvent and non-solvent in the above-noted proportions. The liquid portion of the solution remaining immediately after removing the polycarbonate in the first separation means will, therefore, have a liquid content comprising from about 35 to about 65% solvent (for the polycarbonate) and the remainder will be polycarbonate non-solvent. The amounts of polycarbonate solution and precipitating solution (i.e. non-solvent mixture of polycarbonate non-solvent and polycarbonate solvent) mixed will, of course, depend on the concentration of the polycarbonate solutions and the specific solvents and non-solvents used. The polycarbonate solvent used in the precipitating solution must be miscible with and have a boiling point lower than the boiling point of the non-solvent used. Preferably, the polycarbonate solution and non-solvent mixture of miscible polycarbonate solvent and non-solvent are mixed together by mixing flowing streams thereof under turbulent conditions of agitation. Also, it is preferred that the average residence time in the mixing vessel is from about 20 min. to about 5 hours. The concentration of the polycarbonate solid in the resulting slurry should after mixing of the precipitating solution and the polycarbonate solution be as mentioned above from about 1 to about 15 parts.

If the amount of solvent present in the slurry (mother liquor) after mixing is caused to fall below about 35% (of the liquid portion of the solution) the polycarbonate product recovered tends to become a fibrous, stringy material of extremely low bulk density. If the solvent is caused to be present in the slurry after admixture in an amount greater than about 65% (of the liquid portion of the slurry) the polycarbonate will be so incompletely precipitated from the polycarbonate solution so as to result in a process which will be commercially impractical.

Any polycarbonate not initially recovered which remains either in solution or dispersed in the liquid medium is allowed in the present process to remain in the recovery system throughout and is eventually recovered as final product. The retention of this unrecovered polycarbonate throughout the process in the recovery system improves the final product yield of the polycarbonate by about 2 to about 15%. Also the present process avoids the problems associated with separating all the solvent from all the non-solvent as heretofore required. For that matter, it is important to the present process that the solvent and non-solvent never be completely separated but that they be maintained in the system in the above-noted proportions. It is preferred to carry the process out at a temperature up to about room temperature, since a product having a comparatively higher bulk density is obtained under these temperature conditions. The process is operable, however, at a temperature up to about the boiling point of the solvent used. The reaction, however, may be carried out at an elevated temperature if the bulk density is not important or a relatively low bulk density material is desired.

Various polycarbonate solvents and non-solvents which are miscible with each other can be used in the present process depending on the particular polycarbonate product used. In addition to the above-noted methods of making polycarbonates, other methods are disclosed in U. S. Patents 3,043,800; 3,043,802 and in Canadian Patents 578,795; 594,805 and 611,970. Any of these methods or other known methods can be used to make the polycarbonate and obtain it as a solute in a solvent therefor. Typical of the solvents which may be used in the present invention are methylene chloride, tetrachloroethane, ethylene dichloride, chloroform, trichloroethane, thiopene, dioxane, tetrahydrofuran, monochlorobenzene, dichlorobenzene and mixtures thereof. Generally speaking, a solvent for polycarbonates is one which will dissolve up to about 30 or 40 parts of polycarbonate in about 60 to 100 parts of solvent. The solvents and non-solvents used in the present invention are materials which are chemically inert to polycarbonates and to each other. While the preferred process involves using the same solvent in the precipitating solution and in the polycarbonate solution, it is also possible to use different solvents or mixtures of solvents in these solutions.

The non-solvents usually are aliphatic hydrocarbon liquids whereby less than from about 0.1 to 1 part of polycarbonate is soluble in 100 parts of non-solvent. It is necessary in the present invention that the solvent used have a boiling point lower than that of the non-solvent. If this relationship between the respective boiling points does not exist, the process will not function in the manner intended and described herein.

Typical of non-solvents that can be used in the present invention are aliphatic hydrocarbons having up to about 20 carbon atoms such as, for example, n-heptane, n-hexane, n-pentane, n-octane, n-nonane, n-decane, n-undecane, 2, methyl pentane, 3-methyl pentane, 2,2-dimethyl butane, 2,3-dimethyl butane and the various heptanes particularly the isomers such as 2-methyl heptane, 3-methyl heptane, 2,2-dimethyl pentane, 2,3-dimethyl pentane, 3-ethyl pentane, 2,2,3-trimethyl butane and mixtures thereof. Other non-solvents are acetone, ethyl acetate, toluene, trichloroethylene, carbon tetrachloride, nitromethane, acetonitrile, 1,1-dichloroethane and dialkyl carbonates. Also, liquid alcohols may be used as the non-solvent in the present process. Typical alcohols are isobutanol, secondary butanol, n-butanol, methanol, ethanol, propanol, n-hexyl alcohol and mixtures thereof.

Various polycarbonate solutions may be used such as, for example, a polycarbonate solution containing from about 1 to 30 or 40% polycarbonate. It is preferred, however, for economics and performance to use a polycarbonate solution containing from about 7 to about 20% polycarbonate.

The following examples described in relation to the accompanying drawing will further define the particulars of the present invention. The drawing represents a schematic illustration of a preferred embodiment of this invention; parts or percentages of the examples are by weight unless otherwise specified.

*Example 1*

A 10% polycarbonate solution (made by phosgenating Bisphenol A in a methylene chloride solvent in accordance with the process disclosed in U. S. Patent 3,028,365) is pumped from supply tank 1 through conduit 3 to mixing vessel 4 containing therein a precipitating solution which comprises a polycarbonate solvent and non-solvent. This precipitating solution contains about 44% methylene chloride (boiling point about 40° C.) and about 56% heptane (boiling point about 98° C.). This precipitating solution is added to the mixing vessel 4 at a continuous rate of about 300 lbs./hr. while the 10% polycarbonate solution is fed to the mixing vessel by pump 2 via conduit 3 at a continuous rate of about 100 lbs./hr. The mixing vessel 4 and the precipitating solution is maintained at a temperature below the boiling point of the methylene chloride. The component solutions are agitated continuously in the mixing vessel 4 and a resulting slurry or mixture is obtained. The slurry is then passed to a filtering means 6 through conduit 5 where the solid polycarbonate is removed from the slurry and collected in container 7. The overflow slurry rate (passed through conduit 5) in terms of its components is about 10 lbs./hr. polycarbonate solids, about 222 lbs./hr. methylene chloride and about 168 lbs./hr. heptane. After the polycarbonate solids are removed in the filtration step, the filtrate is transferred via conduit 8 and pump 9 to a distillation column 10 at a rate of about 390 lbs./hr. This filtrate comprises unrecovered polycarbonate dissolved and/or dispersed in a solution which is controlled throughout the process so as to contain about 57% methylene chloride and about 43% heptane. The temperature at the distillation column 10 is regulated so that the same amount of methylene chloride is boiled off as was added to the mixing vessel via the 10% polycarbonate solution. Thus, about 90 lbs./hr. of essentially pure methylene chloride is removed from the system through the distillation overhead conduit 12. In the distillation bottoms 11 a methylene chloride-heptane mixture remains having therein unrecovered polycarbonate. The liquid portion of this mixture is made up of about 44% methylene chloride and about 56% heptane and is maintained at substantially this same percentage throughout the process. This solution is recycled from the distillation bottoms thorough conduit 14, temperature control means 15, pump 16 and conduit 17 to the mixing vessel 4 at a rate of about 300 lbs./hr., where it is then continuously mixed with a fresh supply of 10% polycarbonate solution.

*Example 2*

The same process as in Example 1 is followed in this example except as follows:

A 15% polycarbonate solution in methylene chloride solvent is mixed with a precipitating solution which contains about 39% methylene chloride and about 61% heptane. This precipitating solution is added to the mixing vessel at a continuous rate of about 400 lbs./hr. while the 15% polycarbonate solution is added to the vessel at a continuous rate of about 100 lbs./hr. These components are agitated at a temperature of about 25° C. until a precipitate forms and a resulting slurry is obtained. This slurry is then passed through a filtering means where the precipitated polycarbonate is removed from the remainder of the slurry. The content of this overflow slurry comprises about 15 lbs./hr. polycarbonate solids, about 241 lbs./hr. of methylene chloride and about 244 lbs./hr. of heptane. After filtration, the resulting filtrate is passed to a distillation column at a rate of about 485 lbs./hr. This filtrate is a solution comprising unrecovered polycarbonate and a liquid portion containing equal parts heptane and methylene chloride. The temperature at the distillation column is controlled so that the same amount of methylene chloride is boiled off as is added to the mixing vessel via the 15% polycarbonate solution. Therefore, at the distillation means, about 85 lbs./hr. of essentially pure bulk methylene chloride is removed from the system. In the distillation bottoms a solvent-non-solvent mixture containing unrecovered polycarbonate remains. This solvent-non-solvent mixture is made up of a liquid portion containing about 39 parts methylene chloride and about 61 parts heptane. This solvent-non-solvent mixture is then recycled to the mixing vessel at a rate of about 400 lbs./hr. where it is continuously contacted with a fresh supply of 15% polycarbonate solution. This process is continued as long as required.

*Example 3*

The process of Example 2 is followed except that varying amounts of components and varying process conditions are used. In this example a 20% polycarbonate solution is continuously mixed at a temperature of about 30° C. with a precipitating solution comprising about 56% methylene chloride and about 44% heptane. The precipitating solution is added to a mixing vessel at a continuous rate of about 300 lbs./hr. while the 20% polycarbonate solution is continuously added at about 100 lbs./hr. A precipitate is formed and a slurry is obtained. The slurry overflowing from the mixing vessel contains about 20 lbs./hr. polycarbonate solids, about 248 lbs./hr. methylene chloride and about 132 lbs./hr. heptane. The solid polycarbonate is then removed by a filtration means and the resulting filtrate transferred to a distillation column at the rate of about 380 lbs./hr. This filtrate comprises recovered polycarbonate dissolved or dispersed in a solution of about 65% by weight methylene chloride and about 35% by weight heptane. At the distillation column the temperature is controlled so that the same amount of methylene chloride as is added in the 20% polycarbonate solution is boiled off. The boiled off solution, therefore, contains about 80 lbs./hr. of essentially pure methylene chloride which is removed through the distilled overhead. The distillation bottoms comprise a mixture having therein unrecovered polycarbonate together with a solvent-non-solvent solution. This solvent-non-solvent solution contains about 56 parts methylene chloride and about 44 parts heptane. This mixture is recycled then from the distillation bottoms to the mixing vessel at a rate of about 300 lbs./hr. where it is again contacted in a continuous manner with a fresh supply of 20% polycarbonate solution.

*Example 4*

The same process as followed in the above examples is used in this example except that varying amounts of components and separating conditions are used. In this example, a 25% polycarbonate solution was continuously mixed at a temperature of about 35° C. with a precipitating solution. This precipitating solution contains about 49% methylene chloride and about 51% heptane. The 25% polycarbonate solution is added to the mixing vessel at a continuous rate of about 100 lbs./hr. while the precipitating solution is added at a continuous rate of about 1150 lbs./hr. The slurry obtained is continuously passed to a filtering means. This overflow slurry rate, in terms of its components, is about 25 lbs./hr. polycarbonate solids, about 636 lbs./hr. methylene chloride and about 589 lbs./hr. heptane. After the polycarbonate precipitate is removed at the filtration means, the filtrate is transferred to a distillation column at the rate of about 1225 lbs./hr. The filtrate comprises unrecovered polycarbonate dissolved or dispersed in a solution of about 52% by weight methylene chloride and 48% by weight heptane. In the distillation column about 75 lbs./hr. of essentially pure methylene chloride is removed through the distillation overhead while leaving in the distillation bottoms a mixture comprising about 49 parts methylene chloride and about 51 parts heptane together with some unrecovered polycarbonate. This mitxure is then recycled to the mixing vessel at the rate of about 1150 lbs./hr. where it is continuously contacted with a fresh supply of 25% polycarbonate solution.

*Example 5*

A similar process as discussed in Examples 1 to 4 is followed except in this example a 25% polycarbonate solution is added to a mixing vessel at a continuous rate of 100 lbs./hr. and mixed with a precipitating solution which is added to the mixing vessel at a continuous rate of about 260 lbs./hr. This precipitating solution contains about 38% methylene chloride and about 62% heptane. The temperature of the precipitating solution is maintained at about 25° C. The components are mixed until a precipitate forms and a resulting slurry is obtained. This resulting slurry is then passed to a filter where the precipitated polycarbonate is removed from the remainder of the slurry. The overflow slurry rate, in terms of its components, is 25 lbs./hr. polycarbonate solids, about 174 lbs./hr. methylene chloride and about 161 lbs./hr. heptane. After the polycarbonate is removed by filtration the filtrate is transferred to a distillation column at a rate of about 335 lbs./hr. The filtrate comprises unrecovered polycarbonate dissolved or dispersed in a solution of about 52% by weight methylene chloride and about 48% by weight heptane. At the distillation means 75 lbs./hr. of essentially pure methylene chloride is removed and remaining in the distillation bottoms is a mixture containing unrecovered polycarbonate together with a solution of about 38 parts methylene chloride and about 62 parts heptane. This mixture is then transferred from the distillation bottoms to the mixing vessel where it is fed at a rate of about 260 lbs./hr. and mixed with about 100 lbs./hr. of a 25% polycarbonate solution. This process is continued for a period of several hours.

Although specific solvents, non-solvents, polycarbonate solutions and conditions have been specified in the above examples, the other components and conditions discussed in the disclosure give results similar to those indicated in the above examples.

Although the invention has been described in considerable detail in the foregoing discussion for the purpose of illustration, it is to be understood that variations can be made by those skilled in the art without departing from the spirit of the invention and scope of the claims.

What is claimed is:

1. A continuous process for separating polycarbonate from its solvent in a solution thereof which comprises continuously mixing in a mixing means a polycarbonate solution and a precipitating solution, said precipitating solution comprising a polycarbonate solvent and a polycarbonate non-solvent, said solvent being miscible with and having a boiling point lower than the boiling point of said non-solvent to form a mixture containing from about 1 to about 15 parts by weight of precipitated polycarbonate, from about 35 to about 65 parts by weight of polycarbonate solvent and from about 35 to 65 parts by weight of polycarbonate non-solvent, removing from the resulting mixture said pricipitated polycarbonate and that amount of polycarbonate solvent which was initially added via said polycarbonate solution, and continuously recycling the remaining solution to said mixing means where it is mixed with fresh polycarbonate solution.

2. The process of claim 1 wherein said polycarbonate solution contains from about 1 to about 40% by weight of polycarbonate.

3. A continuous process for the substantially complete recovery of polycarbonates from a solution thereof which comprises continuously mixing in a mixing vessel a polycarbonate solution and a precipitating solution, said precipitating solution comprising a polycarbonate solvent and a polycarbonate non-solvent, said solvent being miscible with and having a boiling point lower than the boiling point of said non-solvent to cause precipitation of polycarbonate and formation of a slurry, said slurry containing from about 35 to about 65 parts by weight of polycarbonate solvent, from about 35 to about 65 parts by weight of polycarbonate non-solvent and from about 1 to about 15 parts by weight of precipitated polycarbonate, passing said resulting slurry to a first separation means whereby the precipitated polycarbonate in said slurry is separated and recovered, removing from the remainder of said slurry at a second separation means substantially that amount of solvent which is introduced into said mixing vessel via said polycarbonate solution and continuously recycling the resulting solution to said mixing vessel where it is continuously mixed with a fresh supply of polycarbonate solution.

4. The process of claim 3 wherein said polycarbonate solution contains from about 1 to about 40% by weight of polycarbonate.

5. The process of claim 3 wherein said solvent is selected from the group consisting of methylene chloride, tetrachloroethane, ethylene dichloride, chloroform, trichloroethane, thiophene, dioxane, tetrahydrofuran, monochlorobenzene, dichlorobenzene and mixtures thereof.

6. The process of claim 3 wherein said non-solvent is selected from the group consisting of aliphatic hydrocarbons having from about 5 to 20 carbon atoms, acetone, ethyl acetate, toluene, trichloroethylene, carbon tetrachloride, nitromethane, acetonitrile, 1,1-dichloroethane, dialkyl carbonates, normally liquid alcohols and mixtures thereof.

7. The process of claim 3 wherein said polycarbonate solution contains from about 7 to about 20% by weight of polycarbonate and the remainder solvent.

8. A continuous process for the recovery of a high bulk density polycarbonate from a solution thereof which comprises continuously mixing in a mixing vessel a polycarbonate solution and a precipitating solution comprising methylene chloride and a polycarbonate non-solvent, said non-solvent having a boiling point at least above 40° C. and being miscible with said methylene chloride at such a rate that the residence time in said mixing vessel is from about 20 minutes to about 5 hours to form a slurry comprising from about 35 to about 65 parts by weight of methylene chloride, from about 35 to about 65 parts by weight of polycarbonate non-solvent and from about 1 to about 15 parts by weight of precipitated polycarbonate, passing said slurry to a filtration means whereby the precipitated polycarbonate is filtered from said slurry, passing the filtrate to a distillation means whereby that amount of solvent which is initially introduced into said mixing vessel via said polycarbonate solution is removed and the remaining solution recycled to said mixing vessel where it is continuously mixed with a fresh supply of polycarbonate solution.

9. The process of claim 8 wherein said polycarbonate non-solvent is heptane.

10. The process of claim 8 wherein said non-solvent is hexane.

11. The process of claim 8 wherein the product has a high bulk density and the amount of non-solvent in the liquid portion of said filtrate is within the range of from about 35 to about 65% by weight of non-solvent with the balance of said liquid portion being substantially all solvent.

References Cited by the Examiner

UNITED STATES PATENTS 3,065,204  11/1962  Dietrich et al. _____ 260—47
3,144,432  8/1964  Fox _____ 260—47

OTHER REFERENCES

Chemical Engineering, Nov. 14, 1960, pp. 174–177.

SAMUEL H. BLECH, *Primary Examiner.*